United States Patent Office 3,732,307
Patented May 8, 1973

3,732,307
BENZOPHENONE HYDRAZONES CONTAINING PERFLUOROALKYL, PERFLUOROALKOXY, AND PERFLUOROALKYLTHIO SUBSTITUENTS
William J. Middleton, Chadds Ford, Pa., assignor to E. I. du Pont de Nemours and Company, Wilmington, Del.
No Drawing. Filed Sept. 24, 1970, Ser. No. 75,236
Int. Cl. C07c *109/16*
U.S. Cl. 260—566 B     9 Claims

ABSTRACT OF THE DISCLOSURE

Fluorinated benzophenone hydrazones are biologically active against insects and show activity in influencing the metabolism of plants.

BACKGROUND OF THE INVENTION

Field of the invention

The present invention is in the field of biologically active chemicals and relates specifically to a novel class of benzophenone hydrazones which are insecticidally active and which show plant growth regulation and inhibition of plant senescence.

Prior art

E. J. Forbes et al., Tetrahydron 8, 67 (1960), describes the hydrazone:

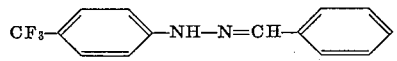

which differs from the present invention in being a substituted hydrazone of an aldehyde.

J. R. DoAmaral et al., J. Med. Chem. 12, 21 (1969) and F. A. French, and Abstract of paper before Division of Medicinal Chemistry, Am. Chem. Soc., September 1969, describe the synthesis of antimalarial drugs of the structure:

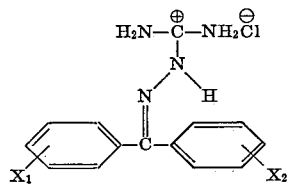

in which $X_1$ and $X_2$ are $CF_3$—, $CF_3O$, halogen, hydrogen, alkyl, alkoxy, hydroxy, and dimethylamino. These differ in many respects from the compounds of the instant invention in being hydrochloride salts, in having the hydrazine-$NH_2$ substituted, in having little restriction on the aryl substituents, and in showing different biological activity.

DESCRIPTION OF THE INVENTION

This invention relates to a class of biologically useful hydrazones of benzophenones that are substituted with at least one flourine-containing substituent. They have the formula

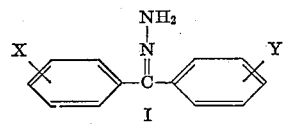

wherein X and Y may occupy the ortho, meta or para positions and

X is selected from the group consisting of perfluoroalkyl, perfluoroalkoxy, and perfluoroalkylthio groups containing up to four carbon atoms, and Y is selected from the group consisting of hydrogen, chlorine, bromine, fluorine, alkyl, alkoxy, alkylthio, perfluoroalkyl, perfluoroalkoxy, and perfluoroalkylthio groups containing up to four carbon atoms.

The novel hydrazones may exist as the syn- and anti-isomers;

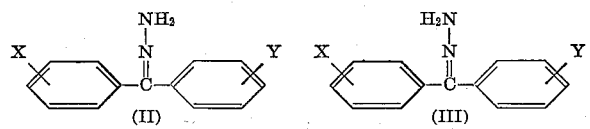

where X and Y are as defined above. It is to be understood that generic Formula I above and in the claims includes the isomers.

The compounds are readily prepared by reaction of the benzophenone with hydrazine in solution or without a solvent. The products are isolated and purified by conventional procedures, such as crystallization, distillation, sublimation, and the like.

SPECIFIC EMBODIMENTS OF THE INVENTION

The following examples, in which all parts or percentages are by weight unless otherwise stated, are intended as illustrative and non-limitative embodiments of the invention. The syntheses of benzophenones not previously reported in the literature are included in the appropriate examples.

EXAMPLE 1

4-trifluoromethylbenzophenone hydrazone, mixture of isomers X=CF₃ and Y=H

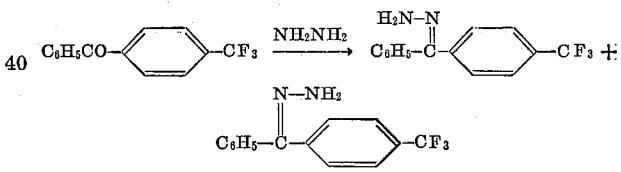

A solution of 250 g. (1.0 mole) of 4-trifluoromethylbenzophenone and 100 ml. of anhydrous hydrazine in 2 liters of ethanol was refluxed for 65 hours and then cooled and poured into 10 liters of water. The solid precipitate that formed was collected on a filter, washed with water, and then dried in vacuum over $P_2O_5$ to constant weight. There was obtained 256.3 g. (97%) of a mixture of the two isomeric forms of 4-trifluoromethylbenzophenone as a white crystalline powder, M.P. 50–105° C. The $^{19}F$ n.m.r. spectrum of this mixture in $CCl_3F$ indicated that the two isomers are present in the ratio of 45:55.

*Analysis.*—Calcd. for $C_{14}H_{11}F_3N_2$ (percent): C, 63.63; H, 4.20; F, 21.57; N, 10.60. Found (percent): C, 63.68; H, 4.25; F, 21.71; N, 10.39.

EXAMPLE 2

4-trifluoromethylbenzophenone hydrazone, high melting isomer X=CF₃ and Y=H

A 20-g. sample of a 45:55 mixture of the two isomeric hydrazones from Example 1 was dissolved in alcohol and fractionally precipitated by the addition of water. Five grams of the less soluble (first to precipitate) fraction was recrystallized two times from hexane to give 4.1 g. of the less soluble isomer as large colorless crystals: M.P. 121–122° C.; u.v. (ethanol) $\lambda_{max}$ 270 m$\mu$ ($\epsilon$ 12,200); $^{19}$F n.m.r. (CCl$_3$F) $\delta$ 63.2 p.p.m. (s) from CCl$_3$F.

Analysis.—Calcd. for $C_{14}H_{11}F_3N_2$ (percent): C, 63.63; H, 4.20; F, 21.57; N, 10.60. Found (percent): C, 64.10; H, 4.29; F, 21.41; N, 10.89.

EXAMPLE 3

4-trifluoromethylbenzophenone hydrazone, low melting isomer X=CF$_2$ and Y=H

A 20-g. sample of a 45:55 mixture of the two isomeric hydrazones from Example 1 was dissolved in alcohol and fractionally precipitated by the addition of water. Five grams of the more soluble (last to precipitate) fraction was fractionally recrystallized from pentane to give 3.34 g. of the more soluble isomer as large colorless crystals: M.P. 59–60° C.; UV (ethanol) $\lambda_{max}$ 287 m$\mu$ ($\epsilon$ 13,200) and 223 m$\mu$ ($\epsilon$ 11,600); $^{19}$F N.M.R. (CCl$_3$F) $\delta$ 63.7 p.p.m. (quintet, J=0.6 Hz.) from CCl$_3$F.

Analysis.—Calcd. for $C_{14}H_{11}F_3N_2$ (percent): C, 63.63; H, 4.20; F, 21.57; N, 10.60. Found (percent): C, 63.50; H, 4.02; F, 21.69 N, 10.82.

EXAMPLE 4

3-trifluoromethylbenzophenone hydrazone X=CF$_3$ and Y=H

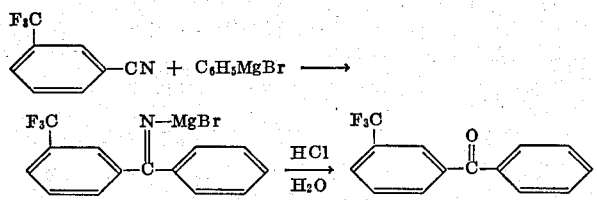

A solution of 54.5 g. (0.3 mole) of phenylmagnesium bromide in 100 ml. of ether was added dropwise to a solution of 43 g. (0.25 mole) of 3-trifluoromethylbenzonitrile in 100 ml. of ether. Concentrated hydrochloric acid (100 ml.) was added dropwise and the solid that formed was collected on a filter and washed with a little water and then ether. There was obtained 68 g. of a light-yellow granular solid. A suspension of 57 g. of this solid in 200 ml. of 10% HCl was heated to boiling for 5 minutes. The oil that resulted solidified upon cooling and was collected on a filter. Recrystallization from pentane gave 3-trifluoromethylbenzophenone as colorless plates, M.P. 47–48° C.

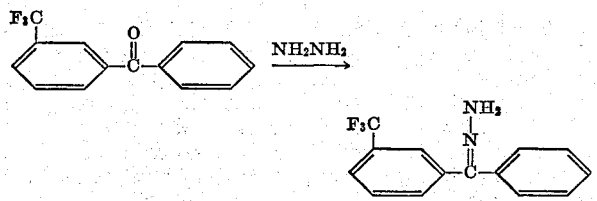

A solution of 25 g. (0.1 mole) of 3-trifluoromethylbenzophenone and 20 g. of anhydrous hydrazine in 200 ml. of ethanol was refluxed for 40 hours, and then poured into 800 ml. of water and extracted with CCl$_3$F. The extract was washed with water, dried with MgSO$_4$ and distilled to give 13.97 g. of 3-trifluoromethylbenzophenone hydrazone as a colorless oil: B.P. 133–136° C. (1.0 mm.); $n_D^{25}$ 1.5700; $^{19}$F N.M.R. (CCl$_3$F) $\delta$ 63.00 (t, J=0.6 Hz., 43%) and $\delta$ 63.05 (s, 57%). The $^{19}$F N.M.R. spectrum indicates the presence of two isomers.

Analysis.—Calcd. for $C_{14}H_{11}F_3N_2$ (percent): C, 63.63; H, 4.20; F, 21.57; N, 10.60. Found (percent): C, 63.91; H, 4.48; F, 21.62; N, 10.66.

EXAMPLE 5

4-trifluoromethoxybenzophenone hydrazone X=CF$_3$O and Y=H

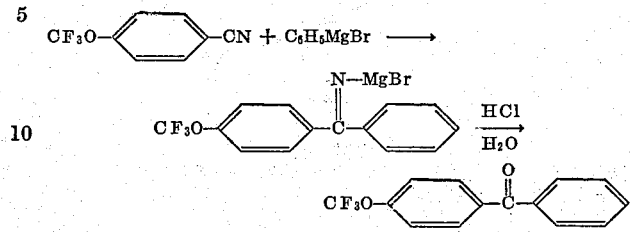

A solution of 21.7 g. (0.12 mole) of phenylmagnesium bromide in 40 ml. of ether was added dropwise to a stirred solution of 18.7 g. (0.1 mole) of 4-trifluoromethoxybenzonitrile in 100 ml. of ether. The mixture was stirred for 1 hour at 25° C., and then 100 ml. of 100% of hydrochloric acid was added dropwise wtih stirring. The precipitate that formed was collected on a filter, washed with ether, and then stirred with 100 ml. of boiling 10% hydrochloric acid for 5 minutes. The oil that formed solidified upon cooling. The solid was collected on a filter and washed with water.

The ether layer of the original reaction mixture was separated and evaporated to dryness to give a solid residue. The solids were combined and recrystallized two times with decolorizing charcoal from pentane to give 18.70 g. (70%) of 4-trifluoromethoxybenzophenone as colorless plates: M.P. 49–50° C.; IR (KBr) 6.04$\mu$; $^{19}$F N.M.R. (CCl$_3$F) $\delta$ 58.3 p.p.m. (t, J=1 Hz.); UV (ethanol) $\lambda_{max}$ 332 m$\mu$ ($\epsilon$ 152) and 252 m$\mu$ ($\epsilon$ 17,500).

Analysis.—Calcd. for $C_{14}H_9F_3O_2$ (percent): C, 63.16; H, 3.41; F, 21.41. Found (percent): C, 63.44; H, 3.42; F, 21.23.

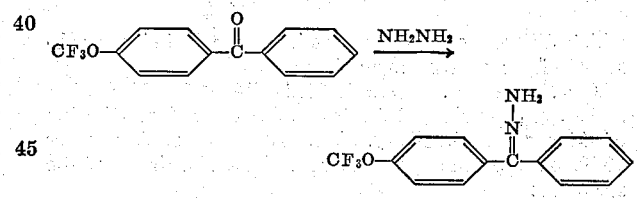

A solution of 10.64 g. (0.04 mole) of 4-trifluoromethoxybenzophenone and 4 ml. of anhydrous hydrazine in 80 ml. of alcohol was refluxed for 60 hours and then cooled and poured into 200 ml. of water. The organic layer was extracted with CCl$_3$F, and the extract was washed with water, dried with MgSO$_4$ and distilled to give 6.95 g. of 4-trifluoromethoxybenzophenone hydrazone as a colorless liquid: B.P. 141–142° C. (1.4 mm.); $n_D^{25}$ 1.5584; U.V. (ethanol) $\lambda_{max}$ 275 m$\mu$ ($\epsilon$ 12,000); $^{19}$F N.M.R. (CCl$_3$F) $\delta$ 58.3 p.p.m. (m).

Analysis.—Calcd. for $C_{14}H_{11}F_3N_2O$ (percent): C, 60.00; H, 3.96; F, 20.34; N, 10.00. Found (percent): C, 60.12; H, 4.02; F, 20.38; N, 9.76.

EXAMPLE 6

4-(trifluoromethylthio)benzophenone hydrazone X=CF$_3$S and Y=H

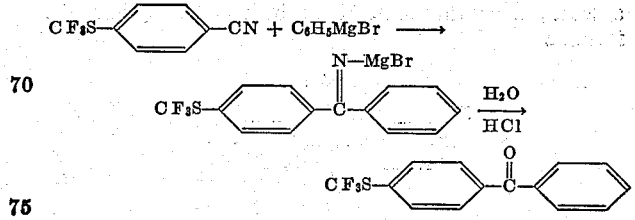

A solution of 21.7 g. (0.12 mole) of phenylmagnesium bromide in 40 ml. of ether was added dropwise to a stirred solution of 20.3 g. (0.1 mole) of 4-(trifluoromethylthio)benzonitrile in 100 ml. of ether. The mixture was stirred for 1 hour at 25° C., and then 100 ml. of 10% hydrochloric acid was added dropwise with stirring. The precipitate that formed was collected on a filter, washed with ether, and then stirred with 100 ml. of boiling 10% hydrochloric acid for 5 minutes. The oil that formed solidified upon cooling. The solid was collected on a filter and washed with water.

The ether layer of the original reaction mixture was evaporated to dryness to give a solid residue. The solids were combined and recrystallized two times with decolorizing charcoal from pentane to give 20.45 g. (72%) of 4-(trifluoromethylthio)benzophenone as colorless crystals; M.P. 68–69° C.; IR (KBr) 6.03μ; UV (ethanol) λ_max. 336 mμ (ε 174); 256 mμ (ε 16,800); ¹⁹F n.m.r. (CCl₃F) δ 42.5 p.p.m. (s).

*Analysis.*—Calcd. for C₁₄H₉F₃OS (percent): C, 59.57; H, 3.21; F, 20.19; S, 11.36. Found (percent): C, 59.69; H, 3.22; F, 20.22; S, 11.95.

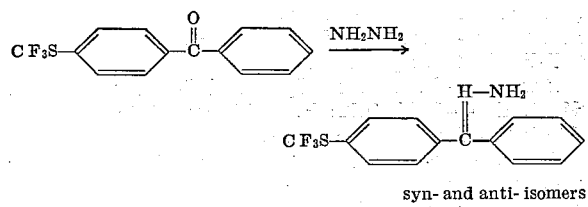

syn- and anti- isomers

A solution of 11.3 g. (0.04 mole) of 4-(trifluoromethylthio)benzophenone and 4 ml. of anhydrous hydrazine in 80 ml. of ethanol was refluxed for 60 hours and then cooled and poured into 200 ml. of water. The organic layer was extracted with CCl₃F, and the extract was dried with MgSO₄ and distilled to give 6.45 g. of 4-(trifluoromethylthio)benzophenone hydrazone as a colorless liquid: B.P. 155–160° C. (1.0 mm.); n_D²⁵ 1.5988; UV (ethanol) λ_max. 290 mμ (ε 13,600); ¹⁹F n.m.r. (CCl₃F) δ 42.8 p.p.m. (s, 33%) and 43.2 p.p.m. (s, 67%).

*Analysis.*—Calcd. for C₁₄H₁₁F₃N₂S (percent): C, 56.74; H, 3.75; F, 19.24; N, 9.46; S, 10.82. Found (percent): C, 56.74; H, 3.69; F, 19.62; N, 9.22; S, 10.88.

EXAMPLE 7

Preparation of 4,4'-bis(trifluoromethyl)benzophenone hydrazone X and Y=CF₃

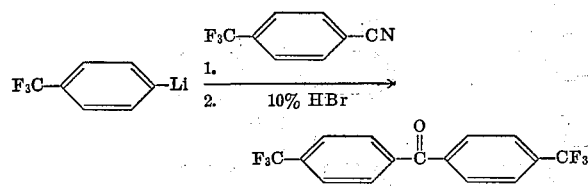

A solution of 40 g. (0.178 mole) of p-trifluoromethylbromobenzene in 50 ml. of ether was added dropwise to 0.181 mole of n-butyllithium in 113 ml. of n-hexane and 200 ml. of ether at 5–10° C. to obtain p-trifluoromethylphenyllithium in solution. A 32.0 g. sample (0.188 mole of p-trifluoromethylbenzonitrile in 50 ml. of ether was added and the mixture stirred for 1 hour, then poured into 200 ml. of 10% HBr which was cooled in an ice bath. Two grams of 4,4'-bis(trifluoromethyl)benzophenone was filtered from solution. The layers which had formed were separated and the organic layer washed with water, dried with MgSO₄ and distilled to give 33.2 g. of 4,4'-bis(trifluoromethyl)benzophenone as a nearly colorless liquid which solidified on cooling: total yield 35.2 g. (62%); B.P. 119° C. (0.9 mm.); M.P. 104–106° C. (recrystallized from pentane); ¹⁹F n.m.r. (CCl₃F) δ 63.0 (s).

*Analysis.*—Calcd. for C₁₅H₈OF₆ (percent): C, 56.62; H, 2.54; F, 35.82. Found (percent): C, 56.73; H, 2.78; F, 35.52.

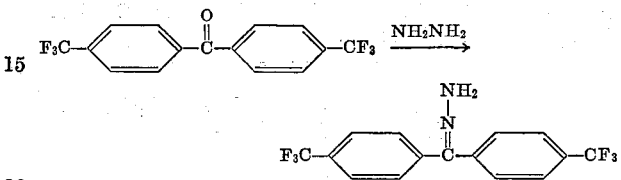

A solution of 10 g. of 4,4'-bis(trifluoromethyl)benzophenone, 5.8 g. of anhydrous hydrazine and 25 ml. of absolute alcohols was defluxed for 7 hours and cooled in ice after standing overnight at room temperature. White crystalline 4,4'-bis(trifluoromethyl)benzophenone hydrazone was filtered from the solution and washed with cold ethanol, and air-dried: 6.2 g. (60%) M.P. 87.5° C.; ¹H n.m.r. (acetone-d₆/CCl₃F) 2.47 τ (multiplet, 8H) 7.25 τ (broad multiplet, 2H). ¹⁹F n.m.r. (acetone-d₆/CCl₃F internal standard) δ 62.6 p.p.m. (singlet, 3F) δ 62.9 p.p.m. (singlet, 3F).

EXAMPLE 8

Preparation of 4-perfluoroisopropylbenzophenone hydrazone (mixture of syn- and anti-isomers)

X=(CF₃)₂CF and Y=H

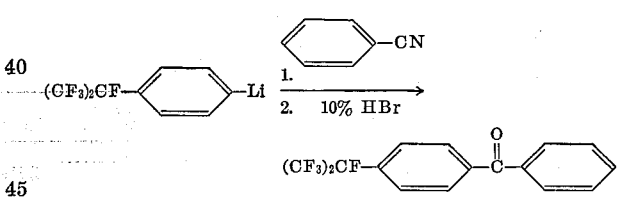

A solution of 32.5 g. (0.1 mole) of p-perfluoroisopropylbromobenzene in 50 ml. of ether was added dropwise to 0.1 mole of n-butyllithium in 63 ml. of n-hexane and 150 ml. of ether at 0–10° C. to obtain p-perfluoroisopropylphenyllithium which remained in solution. A solution of 10.3 g. (0.1 mole) of benzonitrile in 50 ml. of ether was added at 0–10° C. and the mixture stirred for 1 hour, poured into 100 ml. of 10% HBr solution which has been cooled in ice. A sample of 4-perfluoroisopropylbenzophenone was filtered from solution (18.7 g. after drying) and washed with water and ether. The organic layer was washed with water, dried with MgSO₄ and distilled to give 1.5 g. of 4-perfluoroisopropylbenzophenone as a colorless liquid which crystallized on standing to a white solid. Total yield of 4-perfluoropropylbenzophenone, 20.2 g. (58%); B.P. 110–114° C. (0.6 mm.); M.P. 46–48° C.; ¹⁹F n.m.r. (CCl₃F) δ 76.1 p.p.m. (doublet, J=7 Hz., 6F) δ 183 p.pm. (septet, J=7 Hz. to CF₃, 1F).

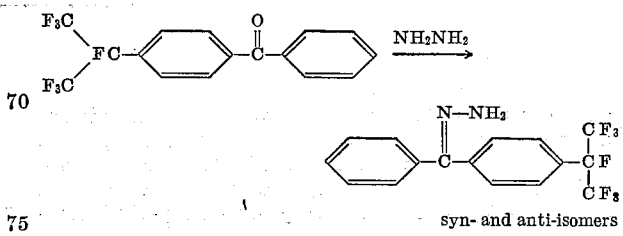

syn- and anti-isomers

A solution of 5 g. of 4-perfluoroisopropylbenzophenone hydrazone, 15 ml. of absolute alcohol and 3 g. of anhydrous hydrazine was refluxed for 7 hours, then allowed to cool. The ethanol was evaporated and the mixture poured into water and the oily layer which separated extracted with $CCl_3F$. The extracts were dried with $MgSO_4$ and then distilled to give 2.5 g. of 4-perfluoroisopropylbenzophenone hydrazone as a colorless viscous liquid: B.P. 137° C. (0.8 mm.); $^{19}F$ n.m.r. ($CCl_3F$); δ 76.2 p.p.m. (two overlapping doublets, J isomer A=13.0 Hz., J isomer B=15.5 Hz., 6F) δ 183 p.p.m. (multiplet, 1F).

Analysis.—Calcd. for $C_{16}H_{11}N_2F_7$ (percent): C, 52.77; H, 3.02; N, 7.69; F, 36.52. Found (percent): C, 52.72; H, 3.41; N, 6.85; F, 35.98.

EXAMPLE 9

4-methoxy-4'-trifluoromethylbenzophenone hydrazone
$X=CF_3$ and $Y=OCH_3$

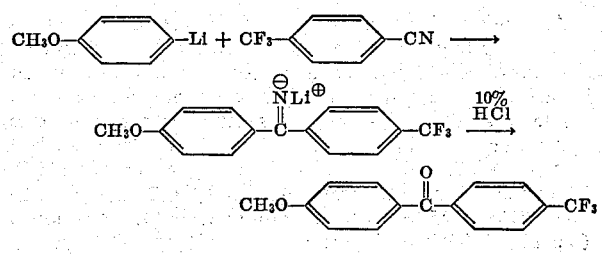

To 37.4 g. (0.2 mole) p-bromoanisole in 400 ml. ether was added dropwise a solution of 0.2 mole n-butyllithium in 100 ml. n-hexane at 0–10°. To this solution was added 34.2 g. (0.2 mole) p-trifluoromethylbenzonitrile in 100 ml. ether at 0–10°. The solution was stirred 15 minutes and poured into 200 ml. of 10% HCl with cooling in ice. The solid which was formed was filtered off and washed with water and a small amount of ether, then vacuum dried over $P_2O_5$ to give 36.7 g. 4-methoxy-4'-trifluoromethylbenzophenone, which was recrystallized from ethanol-water to give 28.1 g. (58%) of white crystals, M.P. 119–121°.

Analysis.—Calcd. for $C_{15}H_{11}O_2F_3$ (percent): C, 64.28; H, 3.96; F, 20.34. Found (percent): C, 64.49; H, 3.96; F, 19.91.

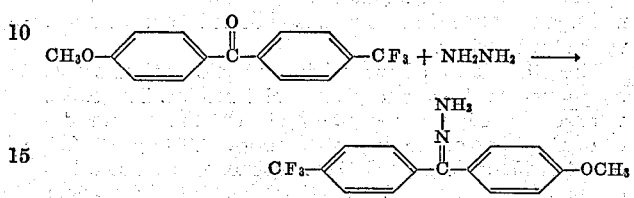

A solution of 10 g. 4-methoxy-4'-trifluoromethyl benzophenone, 6 g. anhydrous hydrazine and 30 ml. ethanol was refluxed 7 hr. On cooling in ice a solid formed and was filtered off, washed with water and dried to give 6.5 g. solid which was recrystallized from ethanol/water to give one isomer of 4-methoxy-4'-trifluoromethyl benzophenone hydrazone: M.P. 97–99°; $^{19}F$ N.M.R. (ether, $CCl_3F$ std.) δ 63.3 p.p.m. (s).

Analysis.—Calcd. for $C_{15}H_{13}N_2OF_3$ (percent): C, 61.22; H, 4.46; N, 9.52; F, 19.36. Found (percent): C, 60.96; H, 4.58; N, 9.23; F, 19.59.

The hydrazones listed in Table I can be prepared by the procedure described in Example 7, except that the p-trifluoromethylbenzonitrile in that examples is replaced by the indicated benzonitriles, and the resulting benzophenones are treated with hydrazine.

TABLE I

| Example number | Benzonitrile | Product hydrazone |
| --- | --- | --- |
| 10 | $CH_3$—⌬—CN | $CH_3$—⌬—C(=N-NH_2)—⌬—$CF_3$ |
| 11 | F—⌬—CN | F—⌬—C(=N-NH_2)—⌬—$CF_3$ |
| 12 | Cl—⌬—CN | Cl—⌬—C(=N-NH_2)—⌬—$CF_3$ |
| 13 | Br—⌬—CN (ortho) | Br—⌬—C(=N-NH_2)—⌬—$CF_3$ (ortho) |
| 14 | Cl—⌬—CN (ortho) | Cl—⌬—C(=N-NH_2)—⌬—$CF_3$ (ortho) |

The hydrazones listed in Table II can be prepared by the procedure described in Example 7, except that the p-trifluoromethylbromobenzene in that example is replaced by the indicated bromobenzenes, and the resulting benzophenones are treated with hydrazine.

TABLE II

| Example number | Bromobenzene | Product hydrazone |
|---|---|---|
| 15 | $CF_3(CF_2)_3$—C$_6$H$_4$—Br | $CF_3(CF_2)_3$—C$_6$H$_4$—C(=N-NH$_2$)—C$_6$H$_4$—$CF_3$ |
| 16 | $(CH_3)_3C$—C$_6$H$_4$—Br | $(CH_3)_3C$—C$_6$H$_4$—C(=N-NH$_2$)—C$_6$H$_4$—$CF_3$ |
| 17 | $CH_3S$—C$_6$H$_4$—Br | $CH_3S$—C$_6$H$_4$—C(=N-NH$_2$)—C$_6$H$_4$—$CF_3$ |
| 18 | $CH_3(CH_2)_3S$—C$_6$H$_4$—Br | $CH_3(CH_2)_3S$—C$_6$H$_4$—C(=N-NH$_2$)—C$_6$H$_4$—$CF_3$ |

The hydrazones listed in Table III can be prepared by the procedure described in Example 7, except that the p-trifluoromethylbromobenzene is replaced by the indicated bromobenzenes, and the p-trifluoromethylbenzonitrile is replaced by the indicated benzonitriles. The resulting benzophenones are treated with hydrazine. The benzonitrile in Example 19 can be prepared from m-(perfluorobutyl)aniline by means of the Sandmeyer Reaction (the aniline is first treated with NaNO$_2$ in cold dilute HCl, and then with KCN in the presence of cuprous salts). The bromobenzene in Example 22 can be prepared by the reaction of p-bromophenyl-magnesium bromide with perfluorobutylsulfenyl chloride in ether. The sulfenyl chloride can be prepared by the reaction of chlorine with perfluorobutyl disulfide in an autoclave at 150° C.

Compositions

Compositions can be formulated by mixing a compound of this invention with one or more additives such as surface active agents, finely divided solid diluents and liquid diluents.

The surface active agents used can be wetting dispersing or emulsifying agents. They may act as wetting agents for wettable powders and dusts, as dispersing agents for wettable powders and suspensions and as emulsifying agents for emulsifiable concentrates. Surfactants also enhance the biological activity of the compounds of this invention. Such surface active agents can include such anionic, cationic and nonionic agents as have heretofore been generally employed in plant control compositions

TABLE III

| Example number | Bromobenzene | Benzonitrile | Product hydrazone |
|---|---|---|---|
| 19 | $CF_3(CF_2)_3$—C$_6$H$_4$—Br | $CF_3(CF_2)_3$—C$_6$H$_4$—CN | $CF_3(CF_2)_3$—C$_6$H$_4$—C(=N-NH$_2$)—C$_6$H$_4$—$(CF_2)_3CF_3$ |
| 20 | $CH_3(CH_2)_3$—C$_6$H$_4$—Br | $CF_3O$—C$_6$H$_4$—CN | $CH_3(CH_2)_3$—C$_6$H$_4$—C(=N-NH$_2$)—C$_6$H$_4$—$OCF_3$ |
| 21 | $F$—C(CF$_3$)$_2$—C$_6$H$_4$—Br | $CH_3(CH_2)_3O$—C$_6$H$_4$—CN | $CH_3(CH_2)_3O$—C$_6$H$_4$—C(=N-NH$_2$)—C$_6$H$_4$—C(CF$_3$)$_2$F |
| 22 | $CF_3(CF_2)_3S$—C$_6$H$_4$—Br | $CF_3$—C$_6$H$_4$—CN | $CF_3(CF_2)_3S$—C$_6$H$_4$—C(=N-NH$_2$)—C$_6$H$_4$—$CF_3$ |

The hydrazones of this invention are useful in biological applications. They may be used in concentrations of 2 to 90% as dusts, solutions, emulsions or propellant compositions as growth regulants to increase the yield of plants and to influence the time of maturity, etc. For this purpose the compounds may be applied to the plants in a concentration of 0.1 to 10 or more pounds per acre.

of similar type. Suitable surface active agents are set out, for example, in "Detergents and Emulsifiers Annual—1968" by John W. McCutcheon, Inc. Other surface active agents not listed by McCutcheon but still effective dispersants by virtue of protective colloid action include methyl cellulose, polyvinyl alcohol, hydroxyethylcellulose, and alkyl substituted polyvinyl pyrrolidones.

Suitable surface active agents for use in compositions include polyethylene glycol esters with fatty and rosin acids, polyethylene glycol ethers with alkyl phenols or with long-chain aliphatic alcohols, polyethylene glycol ethers with sorbitan fatty acid esters, and polyoxyethylenethio ethers. Other suitable surfactants include amine, alkali and alkaline earth salts of alkyl aryl sulfonic acids, amine, alkali and alkaline earth fatty alcohol sulfates, dialkyl esters of alkali metal sulfosuccinates, fatty acid esters of amine, alkali and alkaline earth isethionates and taurates, amine, alkali and alkaline earth salts of lignin sulfonic acids, methylated or hydroxyethylated cellulose, polyvinyl alcohols, alkyl substituted polyvinyl pyrrolidone, amine, alkali and alkaline earth salts of polymerized alkylnaphthalene sulfonic acids, and long-chain quaternary ammonium compounds. Anionic and nonionic surface active agents are preferred.

Among preferred wetting agents are sodium alkyl naphthalene sulfonates, sodium dioctylsulfosuccinate, sodium dodecylbenzene sulfonate, ethylene oxide condensates with alkylated phenols such as octyl, nonyl and dodecyl phenol, sodium lauryl sulfate, and trimethylnonyl polyethylene glycols. Among preferred dispersing agents are sodium, calcium and magnesium lignin sulfonates, low viscosity methyl cellulose, low-viscosity polyvinyl alcohol, alkylated polyvinyl pyrrolidone, polymerized alkyl naphthalene sulfonates, sodium N-oleyl or N-lauryl isethionates sodium N-methyl-N-palmitoyl taurate and dodecylphenol polyethylene glycol esters.

Among preferred emulsifying agents are ethylene oxide adducts of lauric, oleic, palmitic or stearic acid esters of sorbitan or sorbitol, polyethylene glycol esters with lauric, oleic, palmitic, stearic or rosin acids, oil-soluble alkylarylsulfonates, oil-soluble polyoxyethylene ethers with octyl, nonyl and dodecylphenol, polyoxyethylene adducts to long-chain mercaptans, and mixtures of these surfactants.

Compositions containing the new compounds of this invention will contain, in addition to surface active agents, solid or liquid diluents to produce wettable powders, dusts or emulsifiable liquids as desired.

(A) Wettable powders

Wettable powders are compositions which usually contain inert solid diluents in addition to surfactants. These inert diluents may serve several purposes. They can act as grinding aids to prevent mill smear and screen blinding, they can aid rapid dispersion of the mix when placed in water, they can absorb liquid or low melting solid active material to produce a free flowing solid product, they can prevent agglomeration into lumps upon prolonged hot storage and they can permit preparation of compositions with a controlled amount of active ingredient so that proper dosage is easily measured by the consumer.

Suitable diluents may be either inorganic or organic in origin. These include the natural clays, diatomaceous earth, synthetic mineral fillers derived from silica or silicates, insoluble salts produced by precipitation in fluffy form such as tricalcium phosphate or calcium carbonate, and powdered organic diluents such as shell flours, wood flours or corn cob flour. Preferred fillers for the compositions of this invention include kaolin clays, attapulgite clay, nonswelling calcium magnesium montmorillonites, synthetic silicas, synthetic calcium and magnesium silicates and diatomaceous silica.

Wettable powders will normally contain both a wetter and a dispersant. Most preferred for dry wettable powders are those anionic and nonionic surfactants which exist in solid form. Occasionally a liquid, nonionic surfactant, normally considered an emulsifying agent can be used to produce both wetting and dispersion.

Wetting and dispersing agents in wettable powders containing the compounds of this invention, when taken together, will comprise from about 0.5 weight percent to 5.0 weight percent of the total composition. The active component will be present at a concentration of from about 15% to 80% and diluent makes up the balance to 100%. Where needed a corrosion inhibitor or foaming inhibitor may be added at rates of 0.1% to 1.0% with a corresponding reduction in diluent.

(B) Dusts

Dust compositions are those intended for application in dry form with suitable dusting equipment. Since wind drift is undesirable when applying dusts, the most suitable dust diluents are those which are dense and rapid settling. These include kaolinites, talcs, pyrophyllites, ground phosphate rock, sericite, and ground tobacco stems. However, dusts are usually most easily prepared by diluting an existing high-strength composition or wettable powder with a dense diluent so that the final dust will frequently contain a fraction of light, absorptive diluent as well as the more desirable dense filler.

A wetting agent may be desirable in dust formulations so that adhesion to dew-covered foliage is enhanced. Dusts made from wettable powders will usually contain sufficient wetter, but dusts made directly from unformulated active will usually contain an added wetting agent. Dry solid anionic or nonionic wetters are preferred.

Dust formulations may contain from 2.0 weight percent to 20 weight percent of active material, from 0.005% to 1.0% wetting agent, and from 2% to 20% light grinding aid diluent and the balance dense, rapid settling diluent. If made by diluting a prepared wettable powder it will also contain a small amount of dispersing agent which has no active role when the composition is used as a dry dust.

(C) Emulsifiable liquids

Emulsifiable liquids are formulated by combining the compounds of this invention with a suitable emulsifier and an organic liquid with low water solubility. The active component may be completely dissolved in the organic liquid or it may be a finely ground suspension in a nonsolvent liquid. Suitable organic liquids include alkylated naphthalenes, xylene, high molecular weight ketones, such as isophorones, dibutyl or diamyl ketone, esters such as amyl acetate and normal or iso paraffins. Most preferred emulsifiers are blends of oil soluble sulfonates and nonionic polyoxyethylene glycol esters or ethers of fatty acids of alkylated phenols.

The active component in emulsifiable concentrates will be present at from 10 weight percent to about 40 weight percent. Combined emulsifiers will be present at from 3 weight percent to about 10 weight percent and the balance will be an organic carrier liquid or solvent.

While conventional applications of sprayable formulations have usually been made in a dilute form (for example at a rate of about 200 liters per hectare or more), the compounds of this invention can also be applied at higher concentrations in the typical "ultra-low-volume" or "low-volume" applications from aircraft or ground sprayers. For this purpose wettable powders can be dispersed in small amounts of aqueous or non-aqueous carrier. The suspension for emulsifiable concentrates can be used directly or with minor dilution. Special compositions, particularly suitable for ULV applications are solutions or finely divided suspensions in one or more carriers such as dialkylformamides, N-alkylpyrrolidones, dimethylsulfoxide, water, esters, ketones, glycols, glycol ethers and the like. Other suitable carriers include aromatic hydrocarbons (halogenated and non-halogenated), aliphatic hydrocarbons (halogenated and non-halogenated) and the like.

In order that the invention may be better understood, the following examples are given in addition to the above.

EXAMPLE A

Wettable powders:                                              Percent
p-(Trifluoromethyl)benzophenone, hydrazone ___ 31
Sodium alkylnaphthalenesulfonate _____ 4
Sodium ligninsulfonate _____ 4
Kaolin clay _____ 55
Hydrated silica _____ 6

The ingredients are combined, mixed, micropulverized and then blended. The resulting powder wets and disperses readily in water and is suitable for application in normal spray equipment. Any of the other hydrazones may be substituted for the active ingredient here to give useful wettable powder.

EXAMPLE B

Percent
p-(Trifluoromethyl)benzophenone, hydrazone ____ 30.5
Sodium alkylnaphthalenesulfonate _____ 2
Methyl cellulose, low viscosity _____ 2
Calcium ligninsulfonate _____ 2
Diatomaceous silica _____ 63.5

The ingredients are combined, mixed, micropulverized and then blended.

EXAMPLE C

Dust:                                                           Percent
p-(Trifluoromethyl)benzophenone, hydrazone___ 5
Attapulgite clay _____ 5
Talc _____ 90

The active material and attapulgite clay are combined and micropulverized. The talc is added to this mixture and blended.

EXAMPLE D

Emulsifiable liquid:                                           Percent
p-(Trifluoromethyl)benzophenone, hydrazone___ 20
Blend of polyalcohol carboxylic acid esters and sulfonated oils _____ 5
Aromatic heavy naphtha _____ 75

The materials are combined and stirred until a clear solution is formed.

The hydrazones of the invention also possess insecticidal properties, and can be used to protect crops from insects. For example compounds of Examples 3, 5, 6 and 9 gave 100% kill of army worms when applied as a 0.2% aqueous spray to crop plants. A spray was formulated in each instance by dissolving the compound in 10 ml. acetone and diluting with water cointaining Duponol (Du Pont trademark) as a wetting agent. Red kidney bean plants were sprayed about 8 days after planting (primary leaves). When dry, a 2 inch leaf disc was cut from the leaf and put in a petri dish with 10 Southern Army worm larvae which were 12 days from hatch and about 7/16 inch long. At a spray concentration of 0.2% solution, a 100% kill was observed.

The following example illustrates improvement of wheat yield through the application of the product of Example 1:

EXAMPLE E

Spring wheat variety Selkirk was grown in controlled environment rooms under continuous 2500 footcandle light at 70° F.; the growth medium was expanded vermiculite which had been previously washed with dilute acid to remove alkaline buffering capacity.

All plants were watered twice daily with Hoagland's nutrient solution. Test plants were treated at 30, 37, 44, 51, 58 or 65 days after planting; one one set was treated at all of the above times. Each 1½ quart can (containing two plants( received 60 ml. of a 236 p.p.m. water suspension of 4-trifluoromethylbenzophenone hydrazone (45% low melting isomer and 55% high melting isomer) poured around the plant base eight hours after the regular watering with nutrient solution; the plants were watered again with nutrient solution after 16 hours. Control plants were treated exactly as test plants except that 60 ml. distilled water was substituted for the 4-trifluoromethylbenzophenone hydrazone suspension.

At 30 days, the seedhead was just emerging from the boot (leaf sheath from which the seedhead, or cluster, emerges); at 65 days, the plants had started to senesce visibly.

All plants were harvested 90 days after planting. The mature and immature seedheads were counted and weighed. The experimental data are collected in Table IV.

TABLE IV

[The effect of p-trifluoromethylbenzophenone hydrazone on the number and weight of wheat (var. Selkirk) seedheads expressed as percent of control]

| Treatment time (days) | Number of seedheads ||| Weight of seedheads |||
|---|---|---|---|---|---|---|
|  | Mature | Immature | Total | Mature | Immature | Total |
| 30 | 128 | 158 | 135 | 118 | 140 | 120 |
| 37 | 122 | 215 | 147 | 120 | 173 | 125 |
| 44 | 120 | 227 | 149 | 108 | 167 | 114 |
| 51 | 115 | 184 | 133 | 106 | 147 | 110 |
| 58 | 123 | 210 | 146 | 126 | 140 | 127 |
| 65 | 106 | 185 | 127 | 120 | 140 | 122 |
| All of above | 130 | 127 | 128 | 135 | 100 | 131 |

It is concluded from the above experimental data that p-trifluoromethylbenzophenone hydrazone affects at least the two plant development stages of flowering and fruit development. Both the number of seedheads and weight per seedhead were increased.

EXAMPLE F

Selected Concord grape vines in a commercial vineyard were treated with one or two applications of 4-trifluoromethylbenzophenone, hydrazone. Plants treated once were treated only at anthesis; plants treated twice were treated at anthesis and again 16 days later. The chemical was applied to runoff as a suspension in water containing 0.1% polyethylene sorbitan monolaurate. At harvest the following results (average of four replications) were obtained:

TABLE V

| Treatment | Rate, p.p.m. | Times applied | Total berry weight as a percent of untreated control |
|---|---|---|---|
| 4-trifluoromethylbenzophenone, hydrazone | 250 | 2X | 147 |
|  | 500 | 1X | 152 |
|  | 500 | 2X | 180 |
| Untreated control |  |  | 100 |

I claim:

1. A compound of the formula

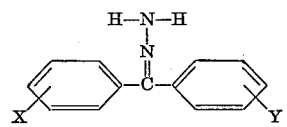

wherein
X is selected from the group consisting of perfluoroalkyl, perfluoroalkoxy and perfluoroalkylthio containing up to four carbon atoms, and
Y is selected from the group consisting of hydrogen, chlorine, bromine, fluorine, alkyl, alkoxy, alkylthio, perfluoroalkyl, perfluoroalkoxy and perfluoroalkylthio containing up to four carbon atoms.

2. The compound of claim 1 wherein X is trifluoromethyl and Y is hydrogen.

3. The compound of claim 2 which is 4-trifluoromethylbenzophenone hydrazone.

4. The compound of claim 2 which is 3-trifluoromethylbenzophenone hydrazone.

5. The compound of claim 1 wherein X is trifluoromethoxy and Y is hydrogen.

6. The compound of claim 1 wherein X is trifluoromethylthio and Y is hydrogen.

7. The compound of claim 1 wherein each of X and Y are trifluoromethyl.

8. The compound of claim 1 wherein X is perfluoroisopropyl and Y is hydrogen.

9. The compound of claim 1 wherein X is trifluoromethyl and Y is methoxy.

References Cited

UNITED STATES PATENTS 2,710,862  6/1955  Schroeder _____ 260—566 B X

OTHER REFERENCES

Beilstein's Handbuch der Organischem Chemie, vol 7 p. 2078 (1968).

BERNARD HELFIN, Primary Examiner

G. A. SCHWARTZ, Assistant Examiner

U.S. Cl. X.R.

424—327; 71—121

UNITED STATES PATENT OFFICE
CERTIFICATE OF CORRECTION

PO-1050
(5/69)

Patent No. 3,732,307    Dated May 8, 1973

Inventor(s) William J. Middleton

It is certified that error appears in the above-identified patent and that said Letters Patent are hereby corrected as shown below:

Col. 3, line 12, "$CF_2$" should be -- $CF_3$ --

Col. 4, line 19, "100%" should be -- 10% --

Col. 5, line 30 in the right hand formula, "$H-NH_2$" should be -- $N-NH_2$ --; line 73, add -- ) -- after "mole"

Col. 8, line 33, "examples" should be -- example --

Col. 9, Example 17, the formula under the column headed "Bromobenzene", "$CH_2S$" should be -- $CH_3S$ --

Example 21, Table III under "Benzonitrile" "$CH_3(CH_2)O$" should be -- $CH_3(CH_2)_3O$ --

Col. 11, line 28, add a comma after "...ates"

Signed and sealed this 19th day of February 1974.

(SEAL)
Attest:

EDWARD M. FLETCHER, JR.
Attesting Officer

C. MARSHALL DANN
Commissioner of Patents

UNITED STATES PATENT OFFICE
CERTIFICATE OF CORRECTION

Patent No. 3,732,307      Dated May 8, 1973

Inventor(s) William J. Middleton

It is certified that error appears in the above-identified patent and that said Letters Patent are hereby corrected as shown below:

Column 2 line 15 should be changed to:

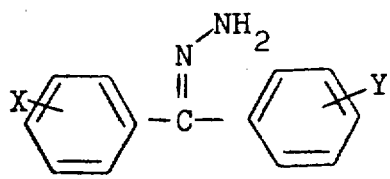  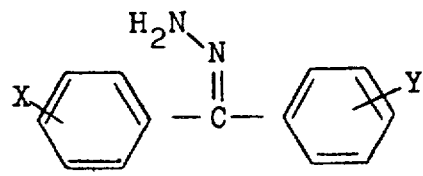

(II)                    (III)

Signed and sealed this 15th day of October 1974.

(SEAL)
Attest:

McCOY M. GIBSON JR.                C. MARSHALL DANN
Attesting Officer                  Commissioner of Patents